US006192296B1

(12) United States Patent
Colmant et al.

(10) Patent No.: US 6,192,296 B1

(45) Date of Patent: Feb. 20, 2001

(54) INSTALLATION FOR EXCHANGING ARTICLES, IN PARTICULAR GAS CYLINDERS

(75) Inventors: Gilles Colmant, Paris; Jean-Paul Fillias, Chantilly; Dominique Gilbert, Marly le Roi; Didier Kayser; Anthony McCord, both of Paris, all of (FR); Sebastien Meneux, Strombeek-Bever (BE); Daniel Payraudeau, Verrieres le Buisson (FR); Jean-Marie Verghade, Saint Maurice (FR); Claude Weber, Milly la Foret (FR)

(73) Assignee: L'Air Liquide Societe Anonyme pour l'Etude et l'Exploitation des Procedes Georges Claude, Paris Cedex (FR)

( * ) Notice: Under 35 U.S.C. 154(b), the term of this patent shall be extended for 0 days.

(21) Appl. No.: 09/125,412

(22) PCT Filed: Dec. 9, 1997

(86) PCT No.: PCT/FR97/02239

§ 371 Date: Oct. 29, 1998

§ 102(e) Date: Oct. 29, 1998

(87) PCT Pub. No.: WO98/27380

PCT Pub. Date: Jun. 25, 1998

(30) Foreign Application Priority Data

Dec. 16, 1996 (FR) ..... 96 15440
Oct. 15, 1997 (FR) ..... 97 12899

(51) Int. Cl.$^7$ ..... G06F 17/00

(52) U.S. Cl. ..... 700/237; 236/214; 236/244

(58) Field of Search ..... 700/237, 242, 700/244, 236, 231, 214; G06F 7/06

(56) References Cited

U.S. PATENT DOCUMENTS

| | | | | |
|---|---|---|---|---|
| 4,411,351 | * | 10/1983 | Lowder et al. | 194/4 |
| 4,778,042 | * | 10/1988 | Warren et al. | 194/212 |
| 5,608,643 | * | 3/1997 | Wichter et al. | 364/479.14 |
| 5,745,366 | * | 4/1998 | Higham et al. | 364/479.12 |
| 5,883,806 | * | 3/1999 | Meador et al. | 364/479.14 |
| 6,011,999 | * | 1/2000 | Holmes | 700/231 |
| 6,029,851 | * | 2/2000 | Jenkins et al. | 221/102 |

FOREIGN PATENT DOCUMENTS

| | | | |
|---|---|---|---|
| 19652147 | * | 5/1998 | (DE) . |
| 0 269 492 | | 6/1988 | (EP) . |
| 0 733 985 | | 9/1996 | (EP) . |
| 2 576 763 | | 8/1986 | (FR) . |
| 2 657 707 | | 8/1991 | (FR) . |
| 2 701 369 | | 8/1994 | (FR) . |
| 2 717 598 | | 9/1995 | (FR) . |
| WO 87/06377 | | 10/1987 | (WO) . |
| WO 89/04016 | | 5/1989 | (WO) . |

* cited by examiner

*Primary Examiner*—Christopher P. Ellis
*Assistant Examiner*—Khoi H. Tran
(74) *Attorney, Agent, or Firm*—Young & Thompson

(57) ABSTRACT

An installation for exchanging gas cylinders includes an enclosed space preferably with controlled access, at least a couple of stations, one for depositing an article to be exchanged and the other for collecting an article to be taken away, each station having a device for retaining the article that can be switched between an open configuration and a locked configuration, the retaining devices of the two stations being coupled such that the locking of one retaining device around an article to be deposited in the deposit station authorizes at least temporarily the opening of the retaining device of an article to be taken away for its removal.

37 Claims, 7 Drawing Sheets

INSTALLATION FOR EXCHANGING ARTICLES, IN PARTICULAR GAS CYLINDERS

BACKGROUND OF THE INVENTION

The present invention relates to the distribution of items or equipment and, more particularly, to the exchange of items or equipment requiring to be overhauled, refilled, readjusted, reconditioned or recycled, such as the exchange of industrial gas cylinders.

The exchanging of such items, notably industrial gas cylinders, has hitherto been a relatively basic affair, under the supervision of personnel who are not always qualified or available, with some of the initiative generally being left to the customer, so that as a result there is no guarantee against dishonest exchanges or industrial risk.

The object of the present invention is to provide a system for the exchange of items that is reliable and inexpensive, that is largely automated and that greatly reduces the above-mentioned risks.

To this end the invention provides a station for the exchange of items, comprising at least one pair made up of one deposit point for depositing an item for exchange and one collection point for collecting an item for removal, each point comprising an item retention device which is switchable between an open configuration and a fastened configuration, the retention devices being coupled so that the fastening of the retention device around an item at the deposit point authorizes, at least temporarily, the item retention device at the collection point to be opened.

In the specific case of bottled industrial gases, which are common throughout industry, a consumer enterprise generally has a central depot to which the supplier delivers the gas cylinders as ordered. The cylinders are distributed from this central depot to the different departments of the enterprise for delivery by the personnel to their point of use. These are referred to as "flying" cylinders to distinguish them from "manifold-connected" cylinders which are delivered and connected by the supplier to their points of use.

As far as flying cylinders are concerned, the Applicant has observed that their use within an enterprise raises a number of problems:

Availability of Full Cylinders in the Central Depot

Oftentimes the number of full cylinders available in a central depot is not supervised. A user can therefore remove the last full gas cylinder of a certain type without ordering a new one, whether through negligence or forgetfulness. The next user who needs a gas cylinder of the same type is therefore unable to continue his work awhile he puts in an order and waits for the supplier to deliver it.

Overstocking

In light of the problem described above, it sometimes happens that several users will independently put in orders for cylinders of the same type, either because they are unaware of the other people's orders, or for fear of their work being brought to a halt. Such behavior on the part of the personnel of the enterprise leads to overstocking, which takes up space in the depot and reduces its capacity to store other types of gas. Such behavior also generates a considerable increase in the cost of running the cylinder park because, in addition to the gas contained in these cylinders, the enterprise has to pay a hiring fee on each cylinder each month.

Too Many Empty Cylinders

Oftentimes, used empty cylinders are not returned by users to the central depot from where the supplier collects them. Consequently the number of flying cylinders in circulation within the enterprise rises steeply. Once again the enterprise must needlessly pay out a large sum for the hire of these unused empty cylinders.

Unauthorized use

Access to the central cylinder storage depot is not always denied to unauthorized persons, often persons from outside the enterprise. Such persons can therefore help themselves dishonestly to the gases bought by the enterprise. These dishonestly used cylinders are usually not even returned to the central depot. This dishonest use adds greatly to costs and disrupts the management of a park of flying cylinders.

At least some of these problems can be remedied if the enterprise sets aside a central depot for gas cylinders which is run by a store manager. However, to engage a store manager is not always feasible for a small or medium-sized enterprise where the park of flying cylinders is not very great. Besides, in a large site within a big enterprise, the size of the site often causes the enterprise to set up several independently-run medium-sized depots at locations close to the points of use, rather than have one large central depot under a store manager.

In accordance with one aspect, it is an object of the invention to solve most of the problems connected with the use of flying cylinders as described above by providing an installation for the distribution of a stock of gas cylinders in which not only is it ensured that a sufficient number of full cylinders is kept available for the authorized users, but also the park of flying cylinders within an enterprise is reduced.

For this purpose another object of the invention is to provide an installation for the distribution of a stock of items, such as gas cylinders, comprising a storage space for the said items, and means for authorizing a user to remove at least one item from the said storage space, the said authorization means comprising, on the one hand, locking means capable of being switched between a position in which the items are locked in said storage space, and a distribution position in which at least one item can be removed by an authorized user, and, on the other, means for operating said locking means, said installation comprising means for evaluating the stock of items, memory means for storing in memory at least one minimum threshold of full items, means for comparing the stock with the minimum threshold of full items, means for issuing an order for new supplies, these being controlled by the comparison means, and means for transmitting the order for new supplies to a supply center.

SUMMARY OF THE INVENTION

The installation according to the invention may include one or more of the following features:

- the memory means for storing in memory at least one minimum threshold comprise at least one memory location for each type of item in order to store in memory at least one minimum threshold for each type of item,
- the memory locations for each type of item comprise both a memory location for a safety threshold for the issuing of an ordinary order for new supplies, and also a memory location for an emergency threshold for the issuing of an urgent order for new supplies,
- the stock evaluating means are also connected to the transmission means for the transmission of a stock inventory to the supply center, this inventory including in particular the number and type of items to be removed from the stock, the stock evaluating means include means for storing the stock inventory in memory, and means for determining a change in the stock inventory, the stock evaluating means include means for entering the number of items to be taken away, the stock evaluating means include means for entering the type of item to be taken away, the stock evaluating means include calculation means connected to the stock inventory memory means as well as to the means for entering the number, preferably the number and type, of items to be taken away, in order to evaluate the stock of items, preferably by type of item, from the stock inventory and from the number as well as from the type of items to be taken away, entered in the data entry means, the stock evaluation means include means for entering the number of items returned by the user, connected to the calculation means for addition of the number of returned items to the number of returned items recorded in the stock inventory memory means, in the case of a storage space designed to receive only one type of items for removal, the stock evaluating means include means for counting the number of items locked in the storage space, the storage space is divided into two subspaces, one for receiving one type of items for removal, and the other for receiving returned items, and the item locking means comprise two individual locking devices, one for each subspace, the authorization means comprise means for counting the number of items returned to the subspace designed to receive returned items and connected to the operating means of the locking means, the locking device associated with the subspace designed to receive the items for removal being only moved into a distribution position by the operating means if these have received a signal relating to at least one returned item, the stock evaluating means include means for counting the number of items locked in the subspace designed to receive items for removal, the authorization means include user identification means connected to the locking device operating means in order that the latter, in accordance with the authorization instructions received from the identification means, switch only predefined locking devices to an inactive position, the stock evaluating means comprise returned-items counting means connected to the operating means of said locking means so that the number of locking devices moved into the inactive position is not greater than the number of returned items counted by the counting means, the stock evaluating means include means for monitoring the position of the locking means, the stock evaluating means only carrying out stock-taking if the monitoring means have detected that the locking means have been switched to the locked position, and the means for monitoring the position of the locking means are connected to the operating means of said locking means in order to prevent the locking devices of compartments associated with an empty condition from being switched into the inactive position at the same time as the locking devices of compartments associated with a full condition.

BRIEF DESCRIPTION OF THE DRAWING

Other features and advantages of the invention will be seen in the following description, given by way of example, without implying any restriction, in the light of the accompanying drawings in which.

DESCRIPTION OF THE PREFERRED EMBODIMENTS

Figure 1:
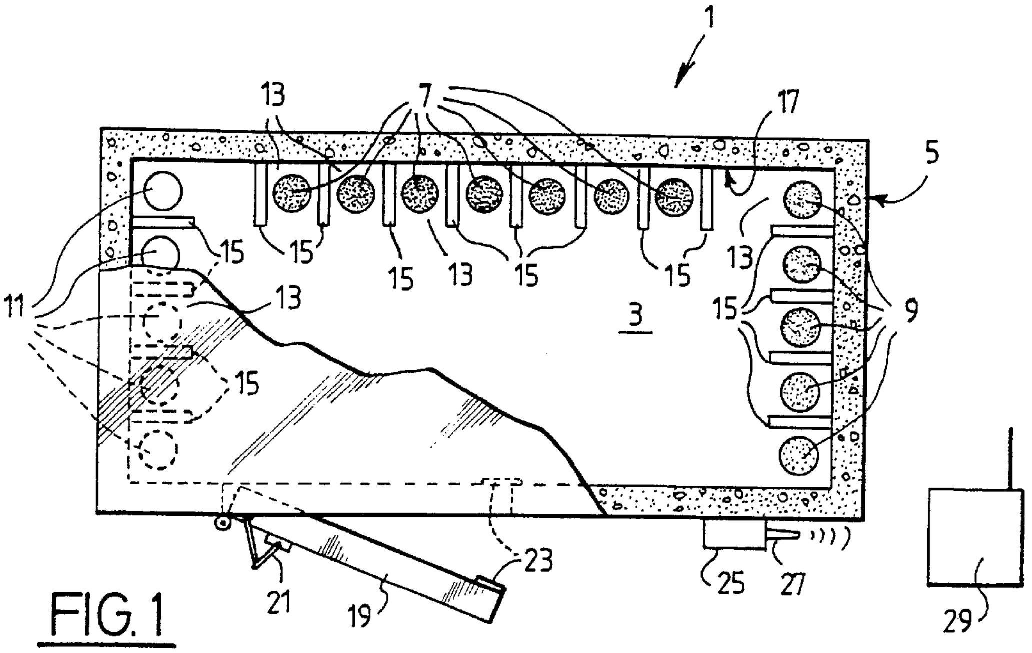
FIG. 1 is a diagram of a first embodiment of a distribution installation for a stock of gas cylinders according to the invention.

FIG. 1 shows an installation 1 for the distribution of a stock of gas cylinders. This installation contains at least one cylinder storage space 3 situated inside a closed pound 5.

In the example illustrated, the storage space 3 contains a stock of different cylinders 7, 9 and 11. Each cylinder is placed in a compartment 13 reserved for this purpose. These compartments 13 are separated from each other by horizontal bars 15 fixed to a wall 17 forming part of the pound 5.

Among the gas cylinders may be distinguished full cylinders 7 and 9 of different types, such as acetylene cylinders and oxygen cylinders, as well as empty cylinders 11. The full cylinders 7 and 9 are for distribution to users, and the empty cylinders 11 are to be taken away and/or exchanged by the gas cylinder supplier in exchange for full cylinders.

The cylinders 7, 9 and 11 are locked inside the storage space 3 with the aid of a door 19 at the entrance to the pound 5. This door 19 comprises an automatic closure mechanism 21 such as those sold under the trademark "Groom", and possesses an automatic fastening device 23.

The installation additionally comprises a central unit 25 located on the outside of the pound 5. This unit 25 is tasked with controlling access to the storage space 3, managing the stock of full cylinders, and, in case of need, issuing an order for new supplies. It has for this purpose a variety of means which will be described in detail with reference to FIG. 2, some of which means may be in the form of a computer or a controller loaded with an execution program.

With reference to FIG. 1, it should also be noted that the unit 25 is connected to the control means of the automatic fastening device 23. It also comprises transmission means 27 for dialoguing with a gas cylinder supply center 29.

The transmission means 27 and the corresponding reception means at the supply center 29 may be of any type, such as radio transmission means.

Figure 2:
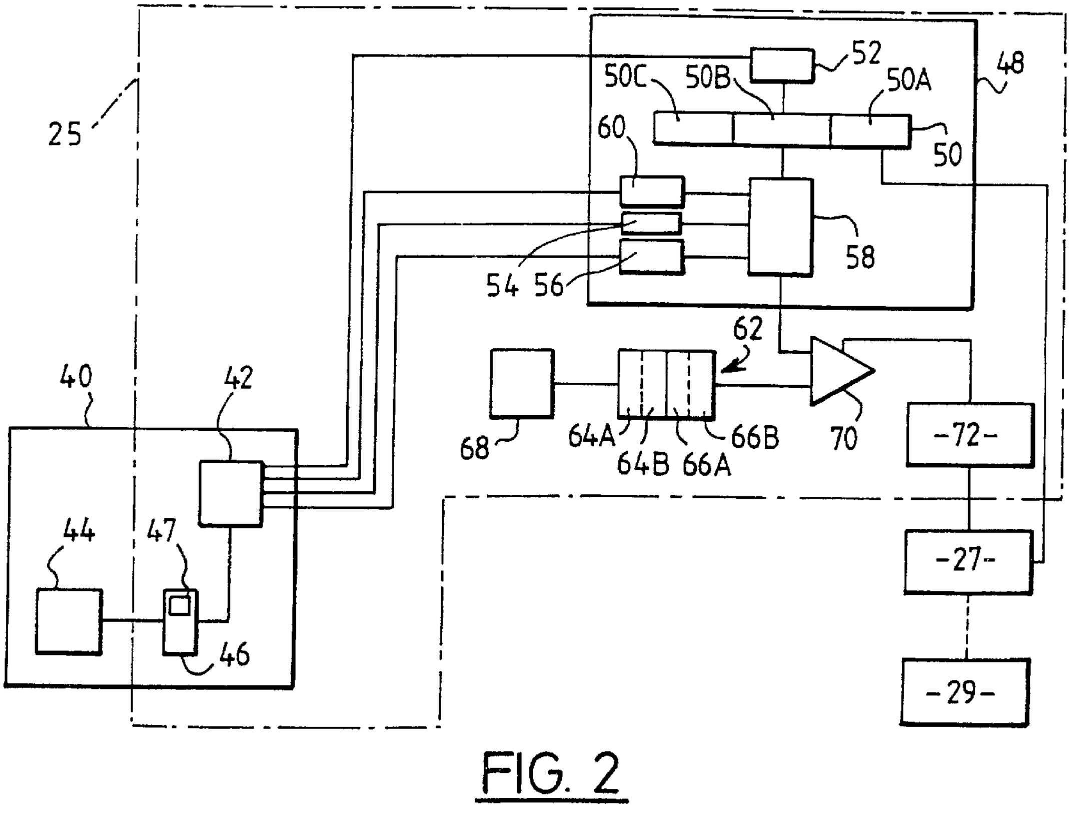
FIG. 2 is an overall diagram of the structure of the storage installation of FIG. 1.

The overall diagram for the structure of the installation 1 of FIG. 1 is given in FIG. 2.

The installation 1 comprises authorization means 40 for authorizing a user to remove at least one cylinder from the storage space 3. For this purpose they comprise user identification means 42 such as for example a badge reader, a “digicode” or any other means of automatic identification. It is envisioned that these identification means 42 will be installed in the central unit 25.

In order to prevent unauthorized persons from gaining access to the cylinders 7, 9 and 11, the authorization means comprise, firstly, locking means 44, namely the door 19 and the fastening device 23 following the example of FIG. 1. These locking means 44 are switchable between a position of locking the cylinders 7, 9 and 11 in the said storage space 3 (door fastend) and a distribution position (door 19 open) in which at least one of the cylinders 7 and 9 can be removed by an authorized user. Secondly, they comprise means 46 for operating said locking means 44. These operating means 46, situated in the central unit 25, are connected to the identification means 42 so that access to the cylinders is given to authorized users only. As a security measure, the operating means 46 contain time delay means 47 for switching the locking means 44 to the locked position automatically after a certain lapse of time.

In order to ensure that a sufficient number of full cylinders is always available in the storage space 3, the central unit 25 contains means 48 for evaluating the stock of cylinders. These stock evaluating means 48 comprise means 50 for storing in memory the stock inventory, these means 50 being loaded via means 52 for entering an initial stock inventory. The storage means 50 contain three memory locations 50A, 50B and 50C associated with cylinders 7, 9 and 11, respectively. The means 52 are connected to the identification means 42. They receive an authorization signal from the latter so that only the supplier and a person in charge of the installation can update the stock inventory in the memory means 50. Also, the stock evaluating means 48 comprise means 54 for entering the number of cylinders to be removed and means 56 for entering the type of cylinders, in the present example acetylene or oxygen cylinders.

The stock evaluating means 48 also comprise means 60 for entering the number of empty cylinders returned by a user.

The data entry means 54, 56 and 60 may be in the form of a screen on which questions are displayed about the number and type of cylinders to be removed and the number of empty cylinders returned, and a keyboard for entering all this information. It is envisioned that the screen and the keyboard will be installed in the central unit 25.

In order to compel the user to enter the information about the number of empty cylinders returned and the number of full cylinders to be removed by type, before allowing him to remove a cylinder, the data entry means 54, 56 and 60 are connected to the identification means 42 so as to be activated by these. The identification means thus also fulfill a function of controller. As a variant, an independent controller is envisioned, connected to the identification means and tasked with activating the data entry means 54, 56 and 60.

The evaluating means 48 also comprise calculation means 58 connected to the stock inventory memory means 50 and the means 54 and 56 for entering the number and type of cylinders to be removed.

From the stock inventory received by the memory means 50 and from the information supplied by the user through data entry means 54, 56 and 60, the calculation means 58 calculate a new stock inventory.

The installation 1 also includes means 62 for storing in memory at least one minimum threshold of full cylinders that must be present in the storage space 3. For each type of cylinder the memory means 62 preferably comprise two memory locations, one for storing a safety threshold at which an ordinary order for new supplies is issued, and a second for storing an emergency threshold at which an urgent order for new supplies is issued. The safety threshold is of course higher than the emergency threshold. In the example of FIGS. 1 and 2, the memory means 62 comprise four memory locations, two 64$a$, 64$b$ for the acetylene cylinders and two 66$a$, 66$b$ for the oxygen cylinders. The memory means 62 are connected to means for entering the threshold values 68 so that these thresholds can be adapted to user needs.

The installation 1 is equipped with comparison means 70 for comparing the stock with the thresholds. To this end, an output from the calculation means 58 and an output from the memory means 62 are connected to corresponding inputs of the comparison means 70.

The stock comparison means 70 are connected to means 72 for issuing an order for new supplies. The output of the issuing means 72 is connected to an input of the means 27 which transmit an order for new supplies to the center 29.

Another input of the transmission means 27 is connected to an output of the stock inventory memory means 50 so as to be able at any time to transmit the current inventory of the stock of cylinders available in the storage space 3 to the supply center 29.

As can be seen in FIG. 2, the central unit 25, marked off by chain lines, comprises means 42, 46 47, 48, 62, 68, 70 and 72.

The installation for the distribution of the stock of gas cylinders shown in FIGS. 1 and 2 functions in the following manner.

An authorized user who wishes to return an empty cylinder and remove a full cylinder, for example of oxygen, identifies him or herself to the identification means 42.

Having recognized the user, the identification means 42 send an activation signal to the means 60 for entering the number of empty cylinders. The user is then invited by a screen to enter on a keyboard the number of empty cylinders returned. The means 60 transmit the number of empty cylinders to the calculation means 58. The calculation means 58 add the number entered on the means 60 to the number of empty cylinders stored in the stock inventory memory means 50, in order to work out in the means 50 the new stock of empty cylinders present in the storage space. After this operation the identification means 42 activate successively the means 56 for entering the type of cylinder to be removed, and also the means 54 for entering the number of this type of cylinder to be removed. As before, the user is invited to enter this data through the keyboard.

After the number of empty cylinders returned, and the numbers and types of full cylinders to be removed, have been input, the identification means 42 send an authorization signal to the means 46 that operate the locking means 44. The operating means 46 then send an unfasten signal to the locking means 44. Referring to FIG. 1, this means that the automatic fastening device 23 is deactivated and the user can open the door 19 in order to a) place the empty cylinder in the storage space 3 and b) for instance remove a full cylinder of oxygen 9. After a predetermined lapse of time, the fastening device 23 is reactivated by the operating means 46. The cylinders are now once again locked inside the storage space 3.

After the data have been entered through the data entry means 54 and 56, the calculation means 58 determine the new inventory of the stock of full cylinders in the light of the stock inventory recorded in the memory means 50. This new stock inventory is sent by the means 58 on the one hand to the stock inventory memory means 50 in order to update it, and on the other to the means 70 for comparing the stock with the thresholds stored in the threshold memory means 62. The comparison means 70 compare, according to the type of cylinder, the new stock inventory with the corresponding thresholds. If the number of full cylinders of all the types of cylinders is greater than the corresponding thresholds previously set by the user, the means 70 give out no order signal. If on the other hand the number of full cylinders of at least one type is below the previously defined corresponding threshold, an order for new supplies is issued, normal or urgent depending on the threshold crossed, by means of an order signal sent by the comparison means 70 to the order issuing means 72. The issuing means 72 then send a signal to the transmission means 27 to transmit the order to the supply center 29.

If the new supplies are brought to the installation by a supplier, the latter is identified as a supplier by the identification means 42. These identification means 42 then activate the means 52 for the entry of an initial stock inventory in order that the supplier can update the stock inventory in the memory means 50. This job of updating the stock inventory can also be assigned to the person in charge of the installation 1. This enables errors introduced through the data entry means to be corrected.

Figure 3:
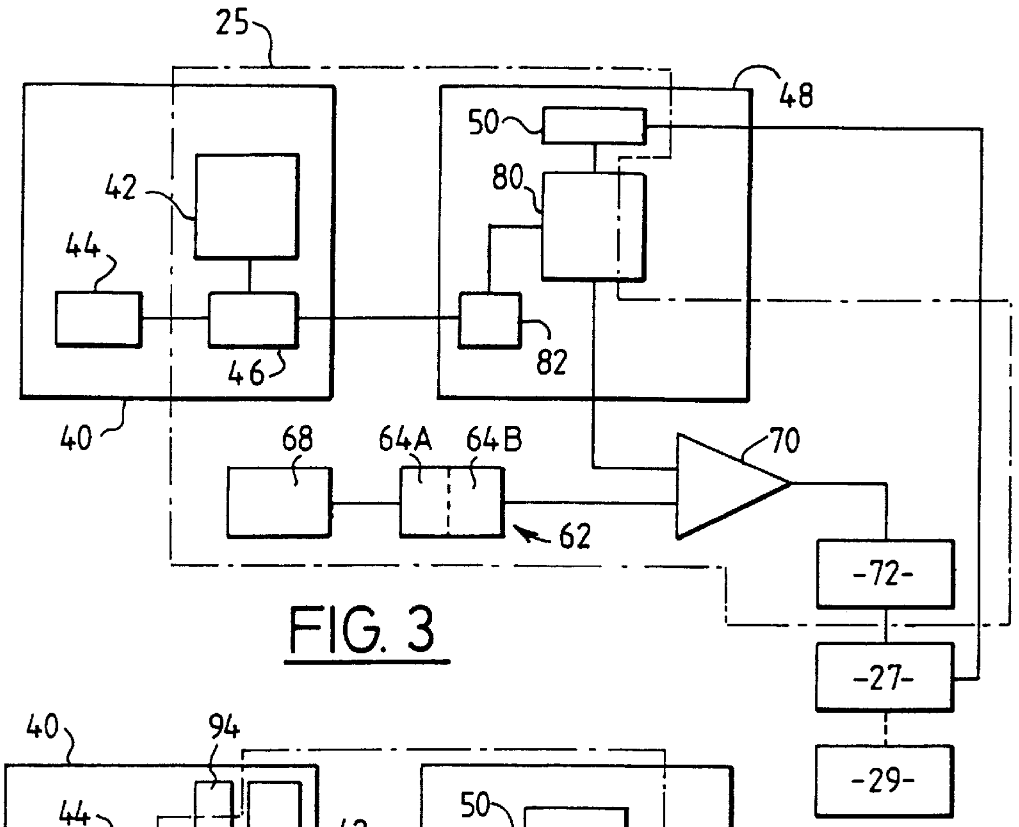
FIG. 3 is an overall diagram of the structure of an installation in a second embodiment.

FIG. 3 shows an electrical diagram for an installation 1 for the distribution of a stock of cylinders similar to the installation shown in FIG. 1, but on this occasion the storage space 3 is only intended to take full cylinders of one type only. In this example, the stock evaluating means 48 comprise means 80 for counting the number of full cylinders present in the pound 5. These counting means may be of any appropriate type, in particular cylinder detectors, such as e.g. flexible rod-type detectors, photoelectric barriers, or magnetic induction detectors installed in the compartments 13 (see FIG. 1). These detectors are located in the compartments in such a way that a gas cylinder produces a presence signal when it is in the compartment.

Another possible form for these counting means 80 is to fit the pound 5 with a photoelectric video camera to sweep the whole storage space. This would be connected to a computer running a program which recognizes cylinders and counts them.

The means 80 for counting the number of cylinders are connected to the stock inventory memory means 50 so that the stock inventory can be transmitted, as in embodiment No. 1, to the supply center 29. As the storage space is only designed for one type of full cylinder, the memory means 50 contain only one memory location. The stock evaluating means 48 also comprise means 82 for monitoring the position of the locking means 44. For this purpose the monitoring means 82 are connected to the operating means 46 of the locking means 44. In a variant the monitoring means 82 are equipped with sensors capable of directly and independently detecting the operating means 46 which control the position of the locking means 44. The monitoring means 82 permanently monitor the position of the locking means, that is to say by analogy with FIG. 1, the position of the door 19 of the pound 5.

For the issuing, when necessary, of an order for new supplies, the counting means 80 are connected to a corresponding input of the means 70 that compare the stock with the thresholds recorded in the memory means 62. Since the storage space is only designed for cylinders of one type, the memory means 62 comprise, in this embodiment, only two locations 64A, 64B for storing an ordinary order threshold and an urgent order threshold, respectively.

The central unit 25 in this embodiment, marked off by chain lines, contains the means 42, 46, 48 with the exception of the detector part of the means 80, 68, 62, 70 and 72.

The manner of operation of this second embodiment of the installation 1 for the distribution of a stock of cylinders is as follows. The user wishing to remove a full cylinder presents him or herself to the identification means 42 so that the latter, after recognizing the user, can send an authorization signal to the operating means 46. The means 46 then switch the locking means 44 from the locked position to the cylinder distribution position. The user then enters the pound and removes as many full cylinders as he requires. Throughout this operation the monitoring means 82 monitor the position of the locking means 44 by monitoring the operating means 46. Once the operating means 46 have switched the locking means 44 back to the locked position, the means 82 send an activation signal to the means 80 to count the number of full cylinders present in the pound. Since the only cylinders are full cylinders of one type, the number of full cylinders present in the pound corresponds to the stock of gas cylinders. The result of the count is sent by the counting means 80 both to the stock inventory memory means 50 and to the means 70 for comparison of the stock with the thresholds. These means then proceed to compare the stock with the thresholds recorded in the memory means 62, as was described with reference to embodiment No. 1.

This embodiment is distinguished by its simplicity of use. The authorized user simply removes the full cylinders he needs, without having to communicate with a machine.

Figure 4:
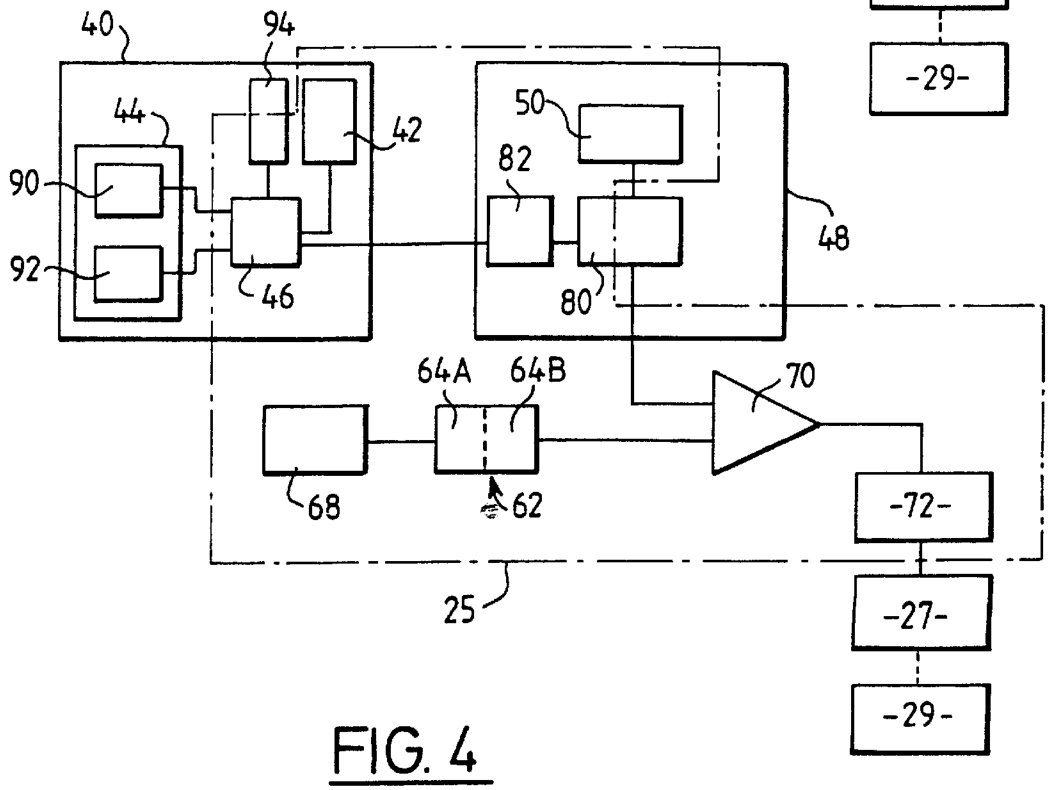
FIG. 4 is an overall diagram of the structure of an installation in a third embodiment.

The electrical diagram shown in FIG. 4 for the installation is a development of that of FIG. 3. It applies to an installation in which the storage space 3 is divided into two subspaces, one for gas cylinders of one type only and the other for empty gas cylinders. Each subspace is equipped with its own locking device 90, 92. This may be achieved by, for example, having two pounds of the type shown in FIG. 1 with a common central unit 25. The locking devices 90, 92 are then access doors with automatic closure mechanisms and associated fastening devices. Together, they form the means 44 for locking the cylinders in. Each device 90, 92 is connected to a corresponding output of the operating means 46 of the locking means 44. Furthermore the authorization means 40 additionally comprise means 94 for counting the number of empty cylinders returned to the subspace set aside for this purpose. These means 94 are identical to the means 80 for counting full cylinders.

The central unit 25 of this embodiment, marked out by chain lines, comprises the means 42, 46, 94 with the exception of the detector part of these means, 48 with the exception of the detector part of means 80, 68, 62, 70 and 72.

The operation of removing a full cylinder takes place in the following manner. For an authorized user, the identification means 42 send a signal to open the locking means 90 of the subspace set aside for returned empty cylinders only. The user must then place the empty cylinder in this subspace. After the locking device 90 has been fastened by the operating means 46, the latter activate the counting means 94 to count the number of empty cylinders returned. Only if the counting means 94 detect at least one returned empty cylinder do they send a signal to the operating means 46 so that the latter will send a deactivation signal to the locking device 92 of the subspace containing the full gas cylinders.

The user can then remove some number of full cylinders and the remainder of the operations occur as described with reference to embodiment No. 2.

With the installation for this embodiment it is possible to compel users to return at least a certain number of empty cylinders. This would in itself reduce the number of "flying" cylinders.

Figure 5:
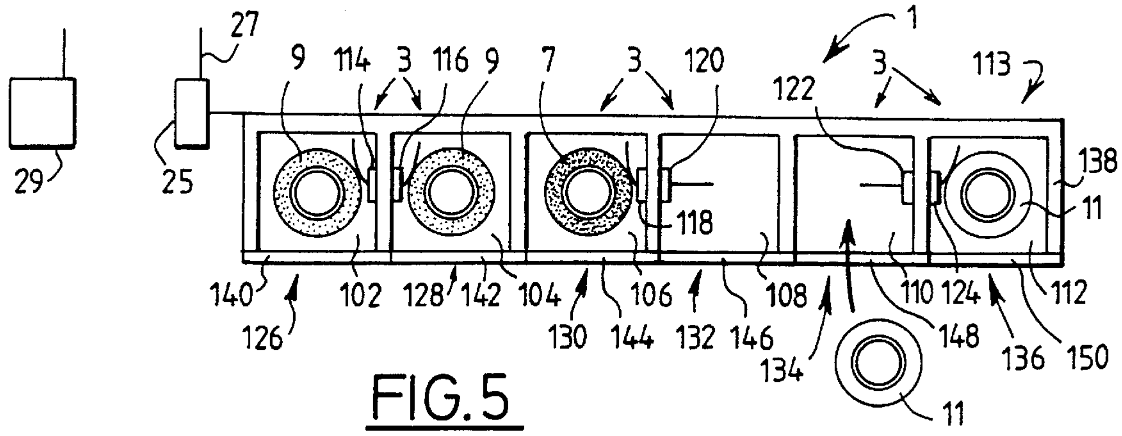
FIG. 5 is a diagram of a rack in an installation in a fourth embodiment.
Figure 6:
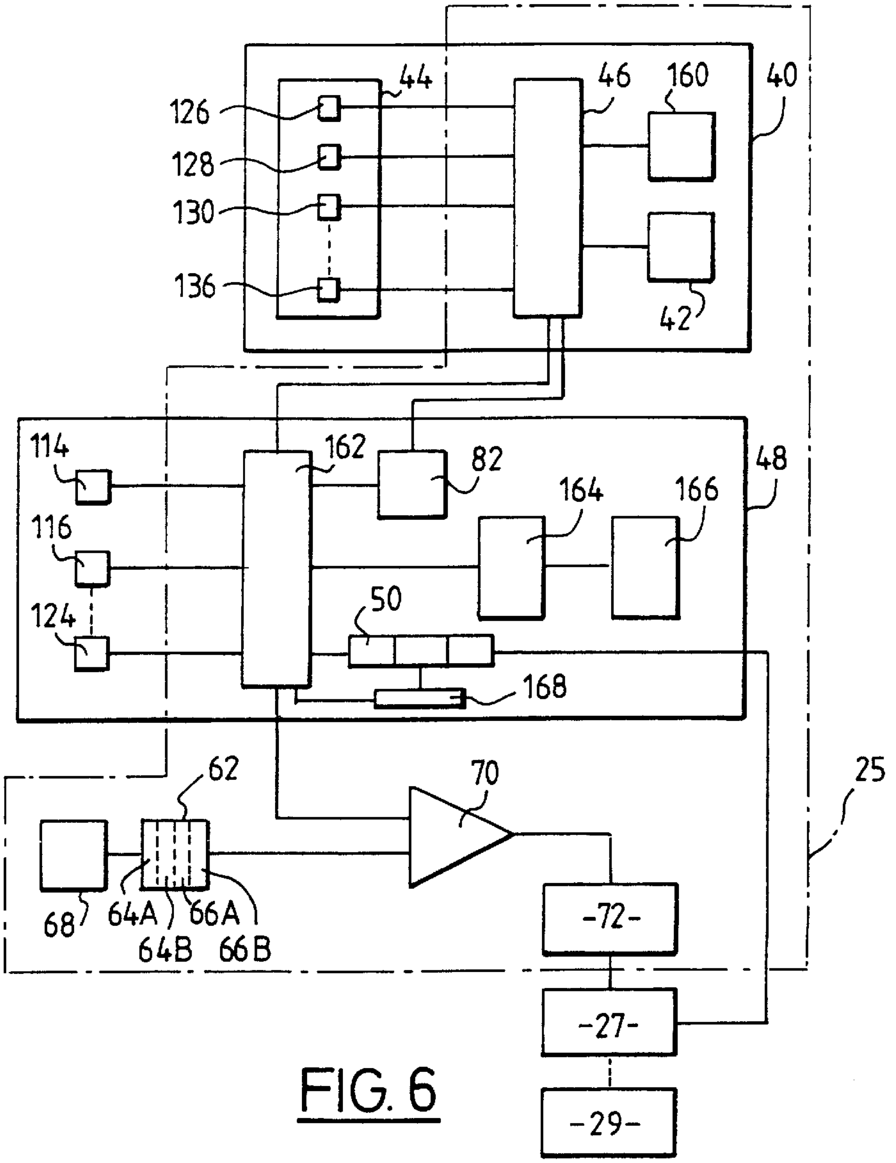
FIG. 6 is an overall diagram of the structure of the installation, corresponding to FIG. 5.

Referring to FIGS. 5 and 6, the description will now be given of a fourth embodiment of the installation for the distribution of a stock of cylinders.

This installation 1 for the distribution of a stock of cylinders comprises a storage space 3 formed by separate compartments 102, 104, 106, 108, 110 and 112 of a rack 113. Each location 102, 104, 108, 110 and 112 is designed to receive no more than one gas cylinder. In addition, each compartment is associated with a cylinder condition, namely empty or full, and, in the case of a compartment associated with a full condition it is also associated with the type of cylinder. Thus, compartments 102 and 104 may for example be associated with oxygen cylinders in the full condition, compartments 106 and 108 with acetylene cylinders in the full condition and compartments 110 and 112 with cylinders in an empty condition.

Compartments 102, 104, 106, 108, 110 and 112 are equipped with means 114, 116, 118, 120, 122 and 124, respectively, for detecting a gas cylinder. These detection means 114, 116, 118, 120, 122 and 124 are part of the stock evaluating means 48 of the installation 1 and are connected to the central unit 25 of the installation 1 in the manner described later.

The detection means 114, 116, 118, 122 and 124 may be, for example, flexible rod-type detectors, each detector being installed in its associated compartment in such a way that the flexible rod of the detector is deflected when a cylinder is present in the compartment in order to produce a presence signal which is sent to the stock evaluating means 48. It is also envisioned that these detection means 114, 116, 118, 120, 122 and 124 will be in the form of magnetic induction detectors or in the form of photoelectric barriers.

In view of the fact that the compartments 102, 104, 106, 108, 110 and 112 are not only associated with conditions of cylinders but also with types in the case of full cylinders, an inventory of the stock can be prepared from the detection of the cylinders in the compartments.

In addition, the cylinder locking means 44 comprise, for each compartment 102, 104, 106, 108, 110 and 112, a cylinder locking device 126, 128, 130, 132, 134 and 136 in the form of a rack frame 138 and barriers 140, 142, 144, 146, 148 and 150, each hinged at one end to the access face of this frame. Each locking device 126, 128, 130, 132 or 136 can be switched between an active position in which a cylinder is locked in its compartment and an inactive position in which a cylinder can be removed from the compartment or be placed in it. Each locking device 126, 128, 130, 132, 134 and 136 comprises means of fastening the bars 140, 142, 144, 146, 148 and 150 and is connected to the operating means 46.

The electrical diagram for the installation 1 of FIG. 5 is given in FIG. 6. A number of elements identical to those of the other embodiments reappear in this diagram. These will not be described again. Additionally, it can be seen that the operating means 46 of the locking means 44 are connected to each individual locking device 126, 128, 130, 132, 134 and 136 of the cylinders. The authorization means 40 also comprise a bypass means 160 which will, as an exception, allow a priority person to remove full gas cylinders without going through the operations of an equal exchange of cylinders. It is envisioned that the bypass means 160 will be in the form of, for example, a key-actuated device. After actuation, the bypass means 160 send a signal to the operating means 46 to switch, for example, all the individual locking devices 126, 128, 130, 132, 134 and 136 to the inactive position.

It is envisioned, moreover, that the identification means 42 send a specific signal, dependent upon the identified user, to the operating means 46 so that only some of the individual locking devices 126, 128, 130, 132, 134 and 136 are switched into the inactive position. Such an arrangement can be used to, for example, authorize a user to remove only cylinders of a certain type.

The means 48 of evaluating the stock of cylinders include a counting means 162 connected to each of the detectors 114, 118, 120, 122 and 124 of the presence of a cylinder in a compartment. This means 162 is connected to a memory 164 that stores the categories assigned to the various compartments, the memory being installed in the evaluating means 48, so that the number of full cylinders of each type and the number of empty cylinders can be counted as a function of the signals received by the detectors 114, 116, 118, 120, 122 and 124 and of the assigned categories recorded in the memory 164. The assigned-category memory 164 is connected to means 166 for assigning a compartment to a cylinder condition (empty or full) and, in the case of a full cylinder, to a cylinder type. These category-assigning means can be used not only to initialize the installation 1 but also to change the category to which a compartment has been assigned in the course of operation. It is thus envisioned that a compartment previously associated with a full condition, but whose gas cylinder has been removed, will be associated with an empty condition, and vice versa in the case of a new supply. In this way the size of the installation, and in particular the storage racks, can be reduced.

The counting means 162 is connected to the operating means 46 in order to transmit a) the compartments still containing full cylinders and b) the number of empty cylinders returned by a user. The result of the count is also sent by the counting means 162 to the stock inventory memory means 50 and to the means 70 for comparison of the stock with the respective full-cylinder thresholds.

The counting means 162 also receives an activation signal from the means 82 which monitor the locking means in order to carry out a stock evaluation only when the devices 126, 128, 130 and 132 of compartments associated with a full-cylinder condition are in the active position.

For additional security, the stock evaluating means 48 possess a means 168 of determining a change in the stock inventory. For this purpose these means 168 are connected to the stock inventory memory means 50 as well as to the counting means 162. It is envisioned that these means 168 will regularly send an activation signal to the counting means 162 to prompt it to work out the current stock of cylinders present in the locations 102, 104, 106, 108, 110 and 112 and communicate the result to the means 168 which will compare the result with the stock inventory recorded previously in the memory means 50.

As shown in FIG. 6, the central unit 25, marked out by chain lines, contains the means 42, 46, 160, 82, 164, 166, 50, 168, 68, 62, 70 and 72.

In an especially advantageous way of operating this embodiment, a user must return an empty cylinder to be able to remove a full cylinder. This form of operation is said to be by compulsory equal exchange. This form of operation is as follows:

In accordance with the embodiment, each user is given a badge authorizing him or her to access no more than one type of cylinder. To remove, say, an oxygen cylinder, the user identifies him or herself at the identification means 42. More generally, these identification means recognize not only that the user is authorized to remove full cylinders, but also the type of cylinders the user is authorized to remove. The result of the identification operation is sent to the operating means 46 of the locking means 44. The means 46 send a switching signal to one of the locking devices, for example device 134 installed in a compartment 110 associated with a cylinder in the empty condition. The user can then open the barrier 148 and introduce the returned empty cylinder. Next, the operating means switch this locking device 134 to the active position. On receipt of a signal from the operating means 46, the monitoring means 82 activate the counting means 162 to determine the current inventory of the stock The counting means 162 informs the operating means 46 as to whether or not an empty cylinder has been returned. Depending on the instructions received earlier by the identification means 42, the operating means 46 switch a single locking device associated with a full oxygen cylinder 7, for example device 130, into the inactive position. The user can then open the barrier 144 and take out a full oxygen cylinder 7. After removal of the full cylinder, an operation detected by the monitoring means 82, the counting means 162 is reactivated by the monitoring means. The means 162 then re-evaluates the stock by type of full cylinder. The result is transmitted to the memory means 50 and also the comparison means 70 which, as in the other embodiments, now perform a comparison with the thresholds recorded in the threshold memory means 62. Depending on what result the comparison throws up, an ordinary or urgent order for new supplies is issued, as was described with regard to embodiment No. 1.

Figure 7:
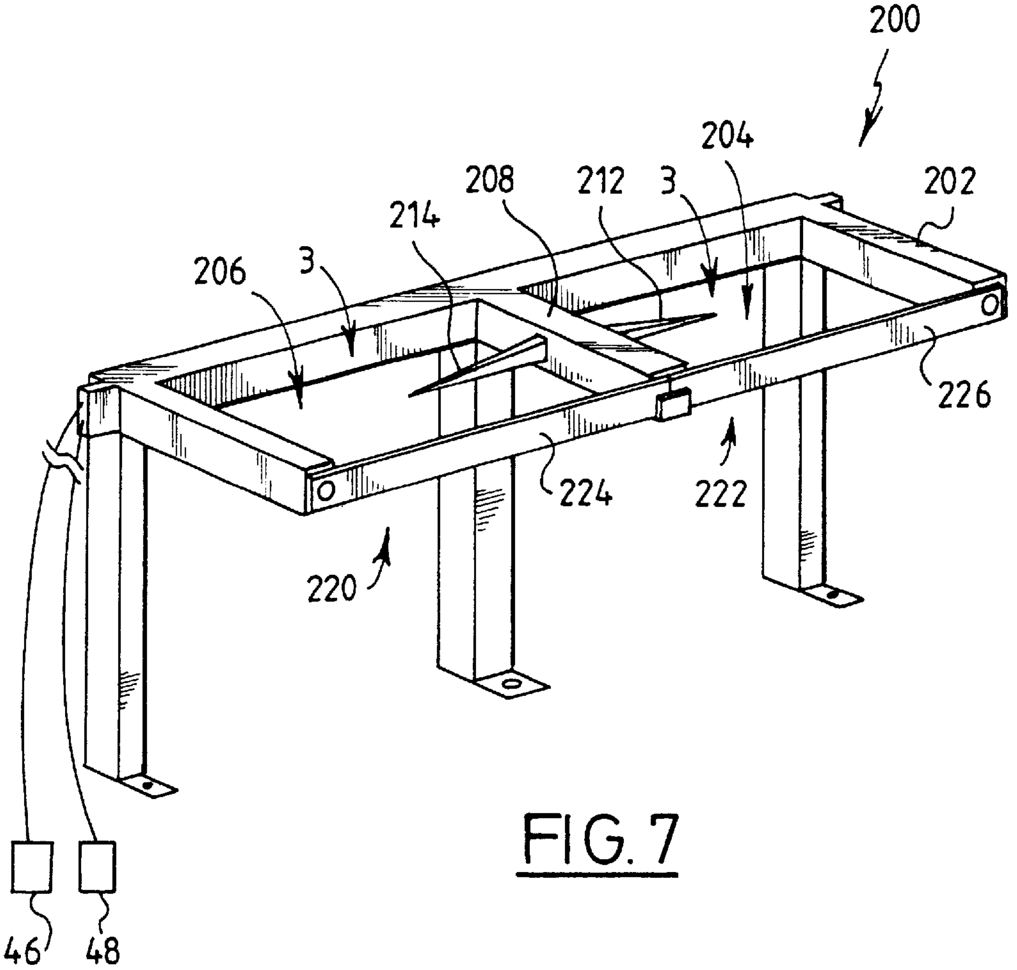
FIG. 7 is a perspective view of a rack of an installation according to the invention in a first embodiment.

Shown in FIG. 7 is a modular rack 200 for storing gas cylinders, intended for example for creating a distribution installation 1 as shown in FIGS. 5 and 6. This rack 200 comprises a frame 202 defining two compartments 204 and 206, each intended to hold one gas cylinder. The frame 202 includes a central cross member 208 separating the two compartments 204 and 206. The cross member 208 is preferably a hollow section containing on each side a detector 212, 214 capable of detecting the presence of a cylinder. Each detector 212, 214 is connected to the stock evaluating means 48. In the example shown in FIG. 7, the detectors 212 and 214 are flexible rod-type detectors. The rods of the detectors 212, 214 extend towards the middle of the compartments 206 and 204 with which they are associated.

The rack 200 constitutes a locking means 44 for cylinders placed in the compartments 204 and 206. For this purpose the rack has one cylinder locking device 220 and 222 for each compartment. Each locking device 220, 222 is connected to the operating means 46. The locking devices 220, 222 each comprise a bar 224, 226 hinged at one end to an access face of the frame 202. The active position of a bar 224, 226, in which the bar locks a cylinder in its compartment, can be fastened by complementary fastening components associated with each bar 224, 226. One of these components is on the non-hinged end of the bar and the other on the holding frame 202. In FIG. 7 the complementary fastening components are formed by a ferromagnetic part mounted on the non-hinged end of the bar 224, 226 and by an electromagnet installed in the front end of the hollow section 208. It is further envisioned that the complementary fastening components will be formed by a hole in the non-hinged end of the bar and by a rod mounted in the frame and movable with the aid of a rod operating device between a fastened position, in which the rod is engaged in the hole, and a retracted position in which the bar can be swung into the inactive position. The rod operating device is preferably a pneumatically or hydraulically operated device. An operating device of this kind is of particular advantage when storing cylinders containing flammable gases. Of course, this rod operating device can also be made in the form of an electromagnet-operated device in which the rod acts as the armature for the electromagnet. This rack operates in a similar way to the rack shown schematically in FIG. 5.

Figure 8:
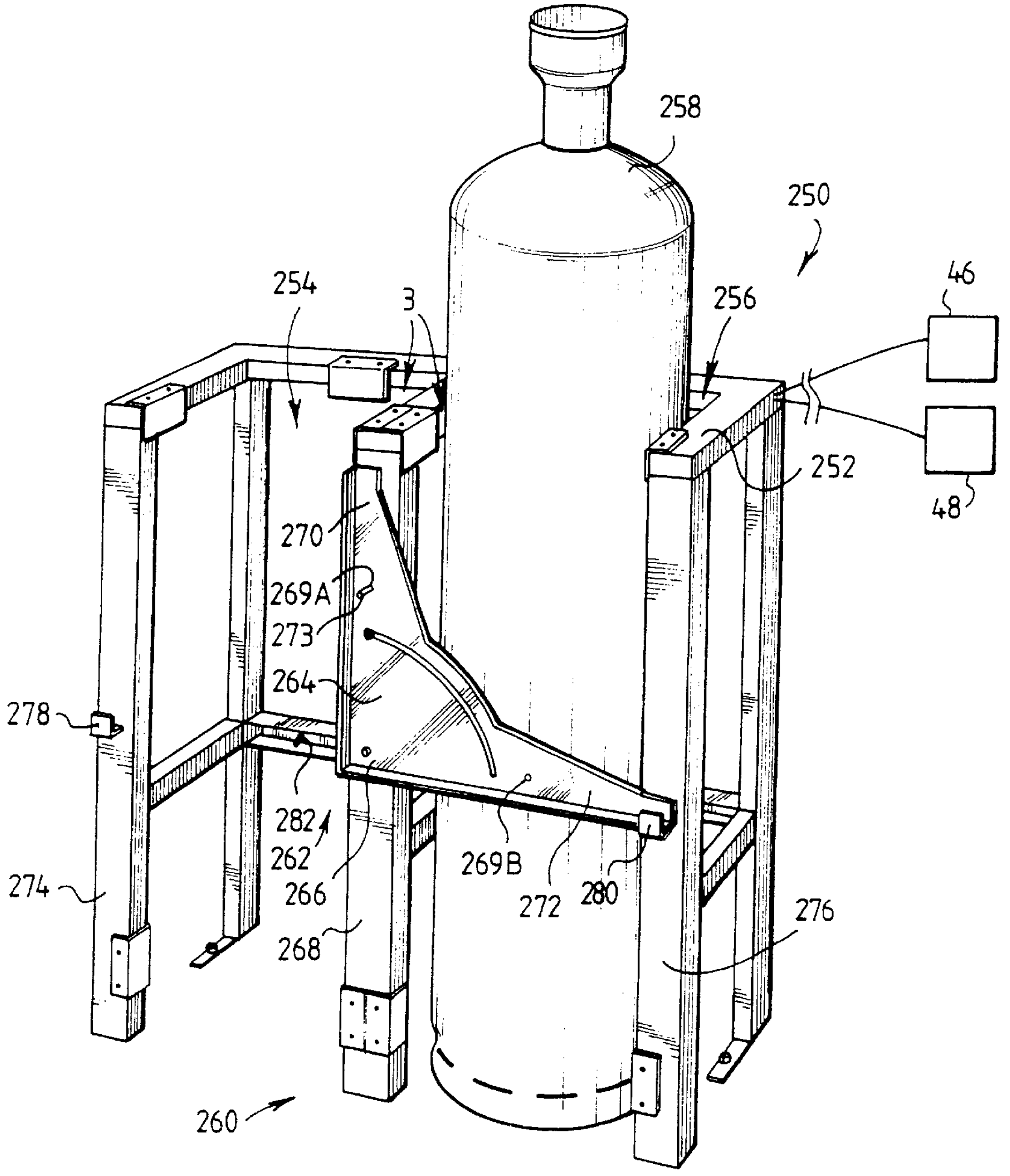
FIG. 8 is a perspective view of a rack of the installation in a second embodiment.

FIG. 8 shows a rack 250 designed for a distribution installation requiring compulsory equal exchange. The rack 250 comprises a frame 252 defining two compartments 254 and 256, one of these 254 being designed for an empty gas cylinder returned in exchange, and the other 256 for a full gas cylinder 258. This frame has an access face 260 through which the gas cylinders can be placed in the compartments 254 or 256. This rack 250 comprises an alternative means 262 of closing off access to the compartments in order to lock either a full cylinder, for example the cylinder 258, or an empty cylinder, in its respective compartment. The alternative closure means 262 is connected to the operating means 46.

The alternative closure means 262 comprises on the one hand an angle piece 264 hinged in the region of its apex 266 to the access face of a central post 268 of the frame 252, and on the other hand complementary components for fastening the angle piece 264 in one of two working positions. These two working positions correspond to the locking of a full or empty cylinder respectively in its respective compartment. The complementary fastening components comprise two holes 269A and 269B in the arms 270, 272 respectively of the angle piece 264, and a rod 273 in the central post 268. This rod 273 is movable, by means of a rod operating device which is also installed in the post 268, between a fastened position, in which the rod 273 is engaged in one of the two holes 269A and 269B, and a retracted position in which the angle piece 264 can be pivoted from one working position to the other.

The frame 250 also comprises stops 278 and 280 on the side posts 274 and 276 of the access face 260 so that the holes 269*a* or 269*b* will automatically, after each pivoting, be in a position in which they can engage on the rod provided in the central post 268. Also, each compartment 264, 266 possesses a detector 282 for detecting the presence of a cylinder. In this embodiment the detectors 282 are magnetic induction detectors installed at the back of their respective compartments 254 and 256, which is why in FIG. 8 the detector for compartment 256 designed to take a full cylinder is hidden by the cylinder 258.

In order to remove the full cylinder 258, an authorized user must place an empty cylinder in the compartment 254 provided for this purpose. Once the detector 282 has detected the presence of an empty cylinder in compartment 254, the rod 273 is moved into its retracted position and the user can pivot the angle piece 264 so that the empty cylinder is locked in the compartment 254. The cylinder 258 is thus released from its compartment 256 and can be removed by the user.

Figure 9:
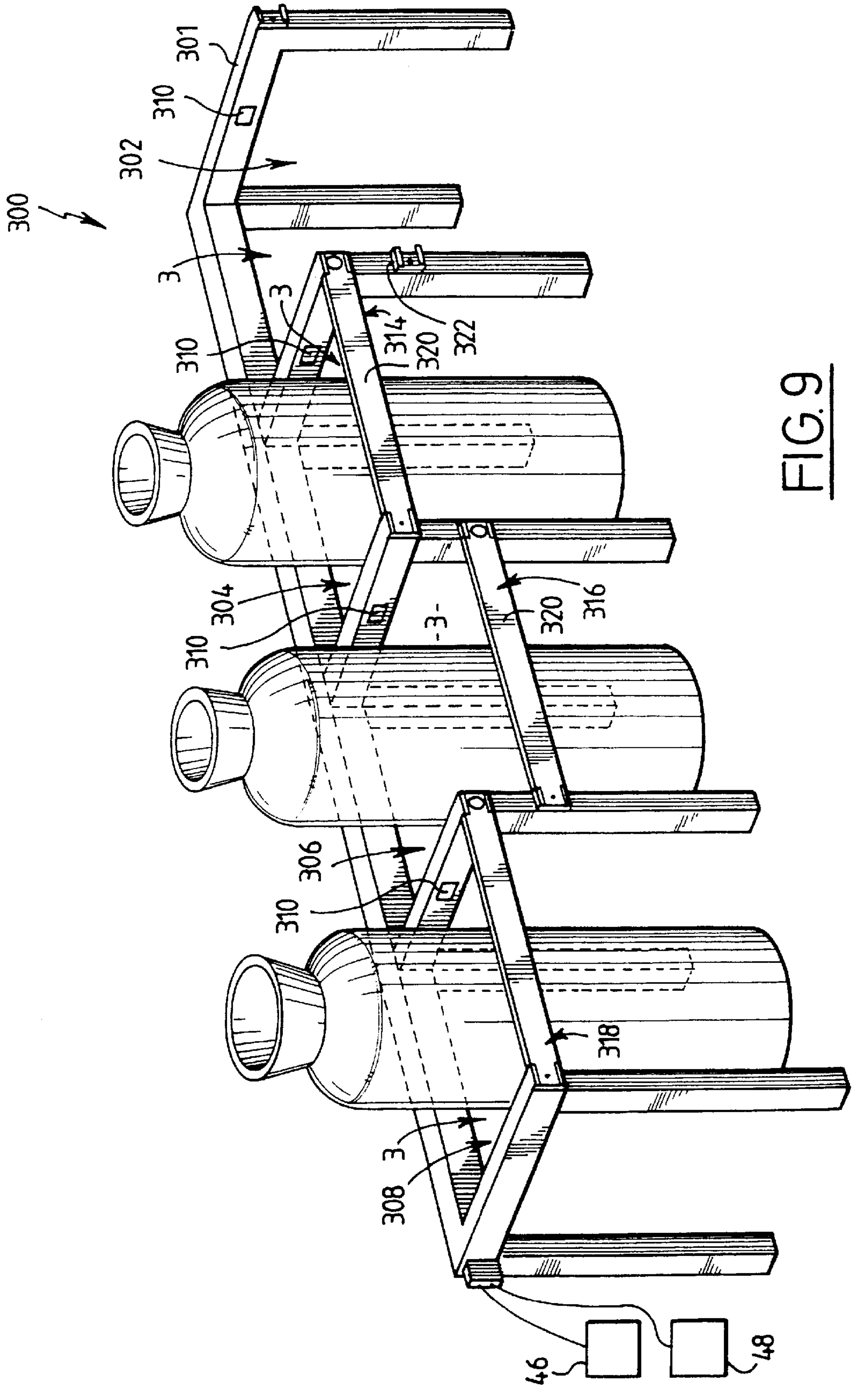
FIG. 9 is a perspective view of a rack of an installation in a third embodiment.

Shown in FIG. 9 is a rack 300 for storing cylinders of one type only and envisioned for use in an installation with compulsory equal exchange. The rack 300 has a frame 301 defining four compartments 302, 304, 306 and 308. Compartment 302 is associated with a compartment designed to hold an empty cylinder, while compartments 304, 306 and 308 are associated with a full condition. Compartments 304, 306 and 308 contain full cylinders. All of the compartments 302, 304, 306 and 308 are equipped with a detector 310 for detecting the presence of a cylinder in the compartment. The detectors 310 are connected to the stock evaluating means 48.

The frame 301 has an access face 312 through which the cylinders can be placed in one of the compartments 302, 304, 306 or 308 or removed therefrom. The rack 300 comprises alternate closure means 314, 316, 318 for two adjacent compartments. Thus, in this embodiment, the alternate closure means 314 either locks a cylinder in compartment 304, or locks a cylinder in compartment 302. The alternate closure means 316 either locks a cylinder in compartment 304, or locks a cylinder in compartment 306, etc.

To this end the alternate closure means 314, 316 and 318 each comprise a bar 320 received in a horizontal guide 322. The bar 320 can slide between a position in which it locks, say, the cylinder placed in compartment 304, and a position in which it locks a cylinder in compartment 302. The alternate closure means 314, 316 and 318 also include complementary closure components enabling the bars 320 to be locked in one of the two working positions. The complementary fastening components may take the form of ferromagnetic parts engaging with electromagnets, or of holes and rods, as described with reference to FIGS. 7 and 8.

In operation, the authorized user places an empty cylinder in compartment 302. The detector 310 signals the presence of the cylinder to the operating means 46. These send a signal to deactivate the alternate closure means 314 so that the user can slide the bar 320 from the position in which it locks the cylinder in compartment 304 to the position in which it locks the returned empty cylinder in compartment 302. The user can then remove the full cylinder from compartment 304. The detector 310 associated with compartment 304 then reports the removal of the cylinder, and compartment 304 is associated by the category-assigning means 166 with a compartment intended to take a cylinder in the empty condition. In a subsequent exchange the user will place an empty cylinder in compartment 304 before removing the cylinder from compartment 306, and so on. With such a rack it is possible to reduce the necessary dimensions of the gas cylinder storage space 3, as also the number of "flying"cylinders in circulation.

Figure 10:
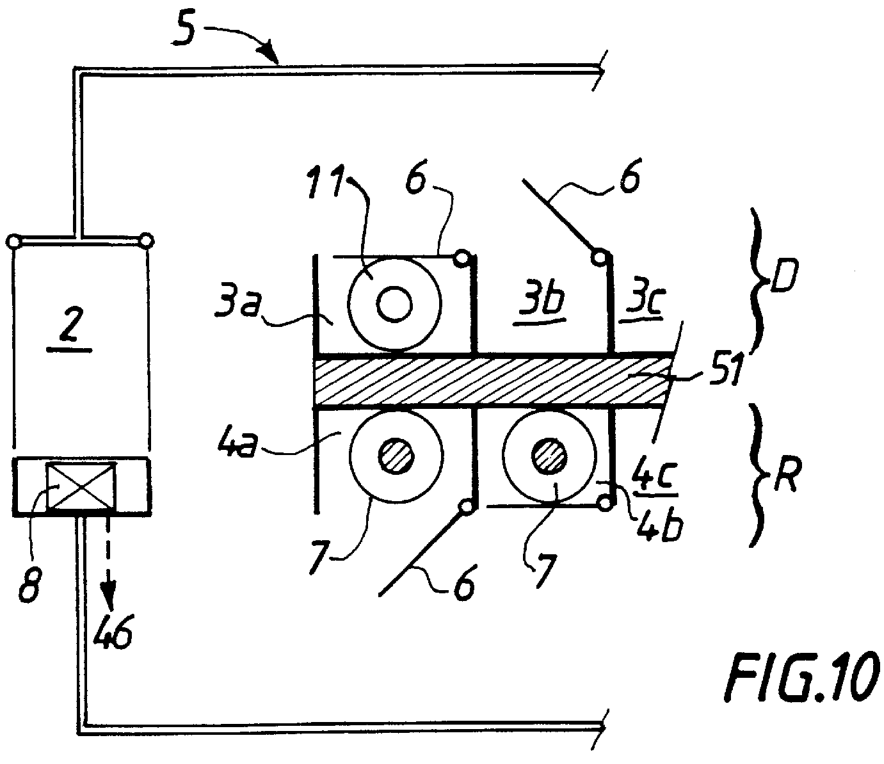
FIG. 10 is a partial schematic plan view of an alternative embodiment of a container exchange station according to the invention.

FIG. 10 shows the closed pound 5, bounded schematically by its external walls, which now include a double door entrance 2. Inside the pound 5 is a first rack D made up of a series of stationary deposit points 3*a*, 3*b*, 3*c* and a rack R of a series of stationary collecting points 4*a*, 4*b*, 4*c*, said points being defined, in the embodiment shown in FIG. 1, by stationary boxes or cells fixed to one of the walls of the pound, in the present case a common central wall 51 in the embodiment illustrated. In this embodiment, access to the boxes is controlled by pivoting doors or shutters 6 whose hinges include fastening means and means for detecting the open or fastened (locked) configurations.

The operation of a station for the exchange of items in accordance with the invention is as follows, in the case of the exchange of refillable containers or gas cylinders:

At the beginning of the day or immediately following the taking of an inventory, the deposit points $\mathbf{3}_i$ are empty and their doors 6 open, while each collecting point contains one full cylinder 7 and its door 6 is closed and fastened (locked). When a customer bringing an empty cylinder for exchange enters the pound 1, after first identifying himself at an access control terminal 8 in the vicinity of the double door entrance 2, he places his empty cylinder 11 in one of the deposit boxes ($\mathbf{3}_a$ in FIG. 1), and closes the door 6 to this box $\mathbf{3}_a$, which then fastens itself in the closed configuration and authorizes, at least temporarily, the door 6 of a paired collecting box, in the present case box $\mathbf{4}_a$ in FIG. 1, to be opened. In the simplest variant, the customer then goes to this box $\mathbf{4}_a$, opens its door 6, takes hold of the full cylinder 7, removes it from the collecting box $\mathbf{4}_a$ and leaves the pound again through the double door entrance 2, identifying himself once again at the access control terminal 8. In more elaborate variants, as seen above, authorization to access a box $\mathbf{4}_i$ after returning an item to a box $\mathbf{3}_i$ can be temporary for a period of time, after the return or after the performance of an additional action, for example the debiting of a customer card or a further act of identification of the customer and/or of the removed cylinder.

Suitable signs will guide the customer as to how to deposit his empty cylinder in the correct rack (if an empty cylinder is deposited in the previously emptied box $\mathbf{4}_a$ he will be unable to fasten the door 6 of this box $\mathbf{4}_a$ in the locked configuration, nor will access be given to any box $\mathbf{4}_i$ containing a full cylinder). Likewise, by way of complementing the color coding of the cylinders, the racks of pairs of boxes D/R for a given gas will be clearly identified by further signs.

Figure 11:
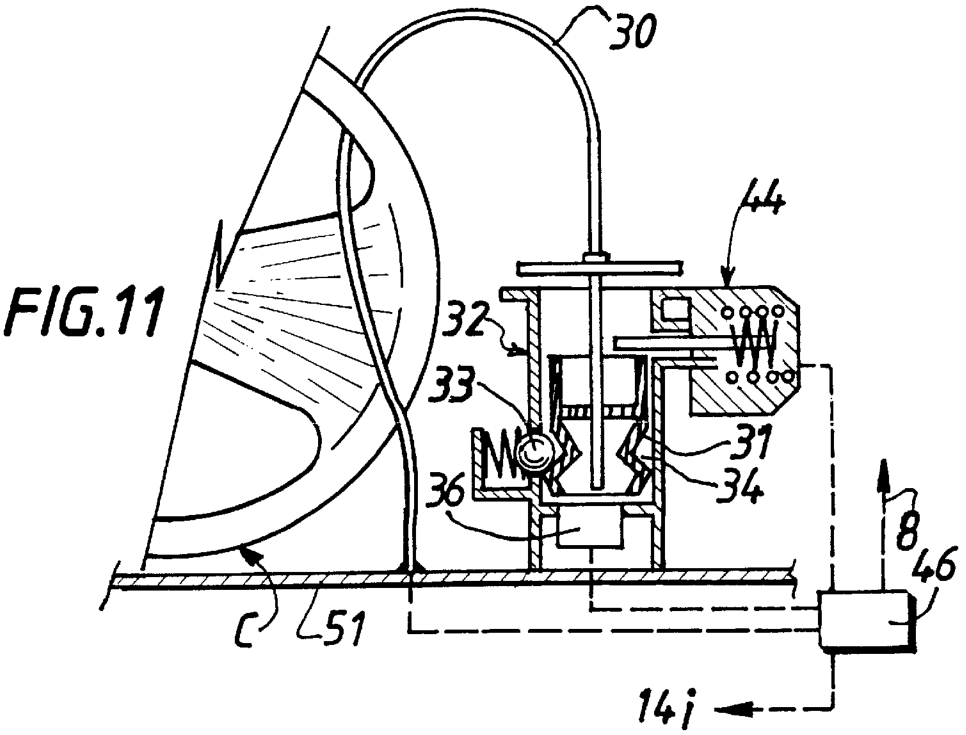
FIG. 11 is a schematic view, partly in section, of an alternative embodiment of a container retention device.

Visible in FIG. 11 is an alternative embodiment of a container retention device for a container exchange installation according to the invention. Here, each box $\mathbf{3}_i$, $\mathbf{4}_i$ (or corresponding compartment that is not closed) is provided not with a door or shutter 6 but with a cord 30 having one end fixed to the wall 51 while its other end comprises a profiled head 31 intended to be inserted in a female receptor 32 also fixed to the wall 51 and defining an internal channel into which the head 31 is introduced. The head 31 is mechanically and temporarily retained in the housing of the receptor 32 by spring means 33, e.g. with a ball, the means 33 being mounted in the receptor and engaging in a peripheral groove 34 in the head. The retention of the head in the receptor 32 or its access into the latter is controlled by an electromagnetically operated pin 44 of normally closed type.

The presence or absence of the head 31 in the receptor 32 is detected by a sensor 36, which may be of the inductive type, contained inside the receptor 32. An electronic control unit 46 similar to that of the means 40 described earlier keeps the electric triggers 44 open when there is non-detection of the head 31 by the sensors 36.

In the same way as in the sequence seen earlier in relation to FIG. 10, the deposit points of rack D normally each have the cord 30 disengaged from the receptor 32 whereas the collection points of rack R are occupied by their full cylinders 7, each with the cord 30 passed through the top C of a cylinder and the head 31 fastened in position in the receptor 32. When the customer brings his empty cylinder 11 to a point $\mathbf{3}_i$, he passes the cord 30 through the top C and pushes the head 10 into the receptor 32, its insertion being detected by the sensor 36 and causing the electric pin 44 to be closed by way of the electronic control unit 46. At the same time the unit 46 opens the electric trigger 44 of the retention device of the associated collection point $\mathbf{4}_i$ where the client can remove the head 31 from its receptor 32, release the full cylinder 7 from its cord and take the latter out of the pound, while all the retention devices of the racks of paired points D and R return to their initial configurations prior to the arrival of the empty cylinder.

In order to prevent dishonest use, the cord 30 advantageously includes a device for detecting if it has been cut, for example with an integrated inductive or capacitive loop coupled to the unit 46.

Although the present invention has been described in relation to certain particular embodiments, it is not limited to these but is on the contrary susceptible of modification and variation as will be clear to those skilled in the art. In particular, to provide better control over the exchange operations as well as monitoring of the total number of cylinders held by individual customers, the control unit 46 of the rotation device may, as has already been seen, be coupled to the access control terminal 8 and, if required, be placed under the latter's control. In the same way, although described in its application to the exchanging of gas cylinders, the invention applies to the exchanging of a variety of different items necessitating exchanges, for example hire items or appliances needing reconditioning, recharging and/or recycling, or counting or measuring equipment in need of readjustment or recalibration.

As a variant, in parallel with the installation or independently thereof, for simplified customer services or for on-site supply logistics, it is envisioned that items be delivered packed or gas cylinders grouped in lots on pallets or gratings. On the reception/distribution platform the grating is placed on compression springs whose stiffness is adapted to the packages to be monitored. These springs must compress by a defined distance associated with a fixed quantity of packages to be monitored. When this quantity is reached, the compression of the springs enables the grating to throw an all-or-nothing contact. The remote surveillance system on the customer's site is an automatic system with four all-or-nothing inputs to each of which a package receptacle may be connected. When an all-or-nothing signal is received, this system automatically calls one or more preprogrammed numbers. The system on the distribution site centralizes the calls from the customer receptacles, records them and prints them out on a printer to enable distribution to deal with them. By adapting the stiffness of the springs, this system can be used to monitor a great variety of packages. It therefore facilitates the optimization of the distribution of products for which the customer gives no order and thus avoids the need for regular visits to certain customers. The advantage of this system is that any sort of package can be remotely monitored in a simple way, especially products packed in liquid form having a wide range of variation of pressure as a function of temperature. This system can therefore be adopted for all deliveries effected by a "milk round" system and thus optimize the logistical means, applying them in groups of packages of similar weight. It can therefore be used for domestic or industrial gas cylinders but also for casks of chemical products.

The invention is not limited to the embodiments described with reference to FIGS. 1–11. For example, the installation can be equipped with a means of receiving and monitoring the operation of the installation, receiving order signals from the supply center to enable remote surveillance of the operating conditions of the installation. Moreover, most of the means described can be brought together in a single apparatus such as, for example, a computer or a controller.

What is claimed is:

1. An installation for the distribution of a stock of items, comprising:

a storage space for housing the items and authorization means for authorizing a user to remove at least one of the items from the storage space, said authorization means comprising item retention means operable between a locking position in which the items are locked in the storage space and a distribution position in which at least one item can be removed by an authorized user, control means for controlling operation of said item retention means, evaluating means for evaluating the stock of items housed in the storage space, memory means for storing in memory at least one minimum threshold of number of items to be removed, comparison means for comparing the evaluated stock of items housed in the storage space with said minimum threshold, ordering means for issuing a restocking orders for new supplies under control of the comparison means, and transmission means for transmitting the restocking orders to a remote supply center.

2. The installation as claimed in claim 1, wherein the item retention means comprises at least one detection means that detects at least one of the locking and retention positions.

3. The installation as claimed in claim 1, wherein the memory means for storing in memory at least one minimum threshold comprise at least one memory location for each type of item in order to store in memory at least one minimum threshold for each type of item.

4. The installation as claimed in claim 3, wherein the memory locations for each type of item comprise both a memory location for a safety threshold for the issuing of an ordinary order for new supplies, and also a memory location for an emergency threshold for the issuing of an urgent order for new supplies.

5. The installation as claimed in claim 1, wherein the evaluating means are also connected to the transmission means in order to send a stock inventory to the supply center, this inventory including the number and type of items.

6. The installation as claimed in claim 5, wherein the evaluating means include stock inventory memory means for storing the stock inventory in memory, and means for determining a change in the stock inventory.

7. The installation as claimed in claim 6, wherein the evaluating means include first data entry means for entering the number of items to be removed.

8. The installation as claimed in claim 7, wherein the stock evaluation means include second data entry means for entering the type of item to be removed.

9. The installation as claimed in claim 8, wherein the evaluating means include calculation means connected to the stock inventory memory means as well as to the first data entry means in order to enter the number of items to be removed, in order to evaluate the stock of items from the stock inventory and from the number of items to be removed.

10. The installation as claimed in claim 9, wherein the stock evaluating means include means for entering the number of items returned by the user, connected to the calculation means for addition of the number of returned items to the number of returned items recorded in the stock inventory memory means.

11. The installation as claimed in claim 1, wherein the storage space receives only one type of items for removal, and wherein the evaluating means include means for counting the number of items locked in the storage space.

12. The installation as claimed in claim 1, wherein the storage space is divided into two subspaces, one for receiving one type of item for removal, and the other for receiving returned items, the item retention means comprise two individual locking devices, one for each of the two subspaces, and the authorization means further comprises means for counting the number of items returned to the subspace designed to receive them and connected to the item retention means, the locking device associated with the subspace designed to receive the items for removal being only moved into a distribution position if these have received a signal relating to at least one returned item.

13. The installation as claimed in claim 12, wherein the evaluating means include means for counting the number of items locked in the subspace designed to receive the items for removal.

14. The installation as claimed in claim 2, wherein the detection means comprises a flexible rod that is mounted in the storage space in such a way that the flexible rod is deflected when an item is present to produce an item-present signal.

15. The installation as claimed in claim 2, wherein the detection means is a magnetic induction detector.

16. The installation as claimed in claim 2, wherein the detection means is a photoelectric barrier.

17. The installation as claimed in claim 2, further comprising compartments for the items and wherein the item retention means comprises for each compartment an item locking device connected to the authorization means and being operated individually thereby.

18. The installation as claimed in claim 17, wherein the authorization means include user identification means connected to a locking device operating means in order that the latter, in accordance with the authorization instructions received from the identification means, switch only selected ones of the locking devices to the inactive position.

19. The installation as claimed in claim 18, wherein the evaluating means comprise a returned-item counting means connected to the locking device operating means so that the number of locking devices moved into the inactive position is not greater than the number of returned items counted by the counting means.

20. The installation as claimed in claim 19, wherein the evaluating means include monitoring means for monitoring the position of the item retention means, the evaluating means only carrying out stock-taking if the monitoring means have detected that the item retention means have been switched to the locked position.

21. The installation as claimed in claim 20, wherein the monitoring means are connected to the locking device operating means in order to prevent the item retention means of compartments associated with an empty condition from being switched into the inactive position at the same time as those of compartments associated with a full condition.

22. The installation according to claim 19, comprising a bypass means actuatable by an exceptional authorization means and connected to the locking device operating means so as to permit at least one item for removal to be removed without it being exchanged for a returned item.

23. The installation as claimed in claim 1, comprising means for receiving and monitoring operation of the installation, and for receiving order signals from the supply center to enable remote surveillance of the operating conditions of the installation.

24. The installation as claimed in claim 1, for the exchange of items in need of readjustment or recalibration.

25. The installation as claimed in claim 1, for distribution or exchange of gas cylinders.

26. The installation of claim 1, wherein the storage space is divided into two subspaces, one for receiving one type of item for removal and the other for receiving returned items, the item retention means comprising two individual locking devices, one for each of said subspaces, and the authorization means further comprising counting means for counting the number of items returned to the subspace designed to receive them and connected to the control means, the item retention means associated with the subspace designed to receive the items for removal being only moved into a distribution position by the control means if these have received a signal relating to at least one returned item.

27. An installation for the exchange of items, comprising at least one pair of places consisting of one deposit place for receiving an item for exchange and one reserve place for housing an item for taking away, each of said places comprising an item retention device switchable between an open configuration and a fastened configuration, each said item retention device being connected to an electronic control unit and mutually coupled so that the fastening of the item retention device at the deposit place authorizes, at least temporarily, the item retention device at the paired reserve place to be opened.

28. The installation of claim 27, wherein each said retention device is associated to at least one detection means for detecting at least one of the open and fastened configurations of the associated item retention device.

29. The installation of claim 28, wherein each said retention device comprises at least one mobile component displaceable between an open position and a locking position.

30. The installation of claim 29, wherein each said retention device includes a stationary component provided with a remotely actuatable fastening means and engageable with the mobile component.

31. The installation of claim 30, wherein the mobile component controls access to a volume for housing an item at said place.

32. The installation of claim 30, wherein the mobile component comes in contact engagement with an item in its locking position.

33. The installation of claim 28, wherein each said place is provided with a detecting means for detecting the presence of an item in said place.

34. The installation of claim 27, wherein the pair of places is located in premises having a controlled access.

35. The installation of claim 34, wherein the premises comprises an access control station coupled to the electronic control unit.

36. The installation of claim 33, comprising at least two pairs of said deposit and reserve places.

37. An installation for the exchange of items, comprising:

at least two pairs of places that each comprise one deposit place for receiving an item for exchange and one reserve place for housing an item for taking away, each of said places comprising an item retention device switchable between an open configuration and a fastened configuration, each said item retention device being connected to an electronic control unit and mutually coupled so that the fastening of the retention device at the deposit place authorizes, at least temporarily, the item retention device at the reserve place to be opened, the pair of places being located in a premises having a controlled access.

* * * * *